May 6, 1952     C. B. HANNAY     2,595,655
HOSE REEL

Filed April 14, 1950     3 Sheets-Sheet 1

INVENTOR
CLIFFORD B. HANNAY

BY *H. G. Lombard*

ATTORNEY

May 6, 1952     C. B. HANNAY     2,595,655
HOSE REEL

Filed April 14, 1950     3 Sheets-Sheet 2

INVENTOR
CLIFFORD B. HANNAY
BY H. H. Lombard
ATTORNEY

May 6, 1952

C. B. HANNAY 2,595,655

HOSE REEL

Filed April 14, 1950

INVENTOR
CLIFFORD B. HANNAY

BY
*H. G. Lombard*

ATTORNEY

Patented May 6, 1952

2,595,655

UNITED STATES PATENT OFFICE 2,595,655

HOSE REEL

Clifford B. Hannay, Westerlo, N. Y., assignor to Clifford B. Hannay & Son, Inc., Westerlo, N. Y., a corporation of New York Application April 14, 1950, Serial No. 155,922

10 Claims. (Cl. 242—86)

This invention relates, in general, to hose reels and, more particularly, to an improved hose reel apparatus comprising a rotatable vertically mounted hose reel which provides a connection from a source of fluid to a hose that remains attached to the reel and may be wound and unwound from the reel, as desired, without disconnection from the source of fluid.

The invention is directed to an improved hose reel apparatus of this character which is particularly useful and advantageous in the handling of relatively heavy hose for passing volatile fluids in fueling and defueling operations such as take place at airport underground service pits, and the like, for example. However, the invention is not limited in any manner or form to the specific type or use of the hose reel apparatus shown and described but rather, is equally adaptable to a wide range and variety of other applications and uses in any similar or related type of hose reel fluid delivering apparatus; and, in this regard, the term "fluid" as used in this disclosure is intended to refer to all types of liquids and gases such as gasoline, oil, water and air.

In the use of hose reels for passing volatile fluids, it is well known that a principal danger of fire or explosion resides in the fact that the hose, as wound upon the reel, frequently is not completely drained, and consequently, any quantity of the volatile fluid remaining in the hose is subject to ignition or explosion. In a vertically mounted type of hose reel, the failure of the hose to drain completely is usually due to the formation of traps, pockets and low points in the hose convolutions which retain quantities of the fluid and prevent proper and complete drainage of the hose in an effective manner.

A primary object of this invention, therefore, is to provide an improved construction for a vertically mounted hose reel which comprises a travelling hose guide and several cooperating guide members which engage the hose at the locations required for effecting a positive winding of the hose on the reel in a series of horizontally disposed, closely packed, even and uniform hose convolutions which are free from traps, pockets or low points that would retain fluid within the hose.

Another object of the invention is to provide a hose reel apparatus of this kind in which the hose reel is provided with a downwardly inclined track, or the like, which supports the lowermost hose convolution in a predetermined downwardly inclined relation and on which the succeeding hose convolutions are formed in a corresponding downward inclination that insures a reverse flow of all fluid in the hose and a complete draining of the hose together with a return of such fluid to the source of supply or a sump or other location that is safely protected against fire or explosion.

A further object of the invention is to provide such a hose reel apparatus which is mounted in a vertical frame structure together with vertical rotary guide rods which cooperate with the aforesaid travelling hose guide and prevent overwinding of the hose on the reel.

Another object of the invention is to provide an improved hose reel apparatus comprising a travelling hose guide, as aforesaid, together with cooperating travelling guide rollers which are mounted on weights in contact with the hose to prevent the hose from climbing on the hose reel during the rewinding thereof, and which guide rollers preferably conform to the contour of the hose and serve to restore the shape of the hose in the event that it is flattened or otherwise deformed in the use thereof.

An additional object of the invention is to provide a hose reel apparatus of the character described in which the travelling hose guide is actuated by a lead screw operating in response to rotation of the hose reel by a motor in direct driving relation to the reel such that the complete apparatus is provided in a compact, unitary construction.

A further object of the invention is for the provision of an improved hose reel apparatus in which the driving means for the hose reel is provided by a motor in direct driving relation to the reel in a highly simplified arrangement which eliminates the use of clutch and gear reduction mechanisms, thereby providing for important savings in this respect.

Another object of the invention is to provide a hose reel apparatus having an improved direct driving arrangement, as just described, comprising an explosion-proof motor which provides for maximum safety in the operation and use of the apparatus.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which.

Figure 1:
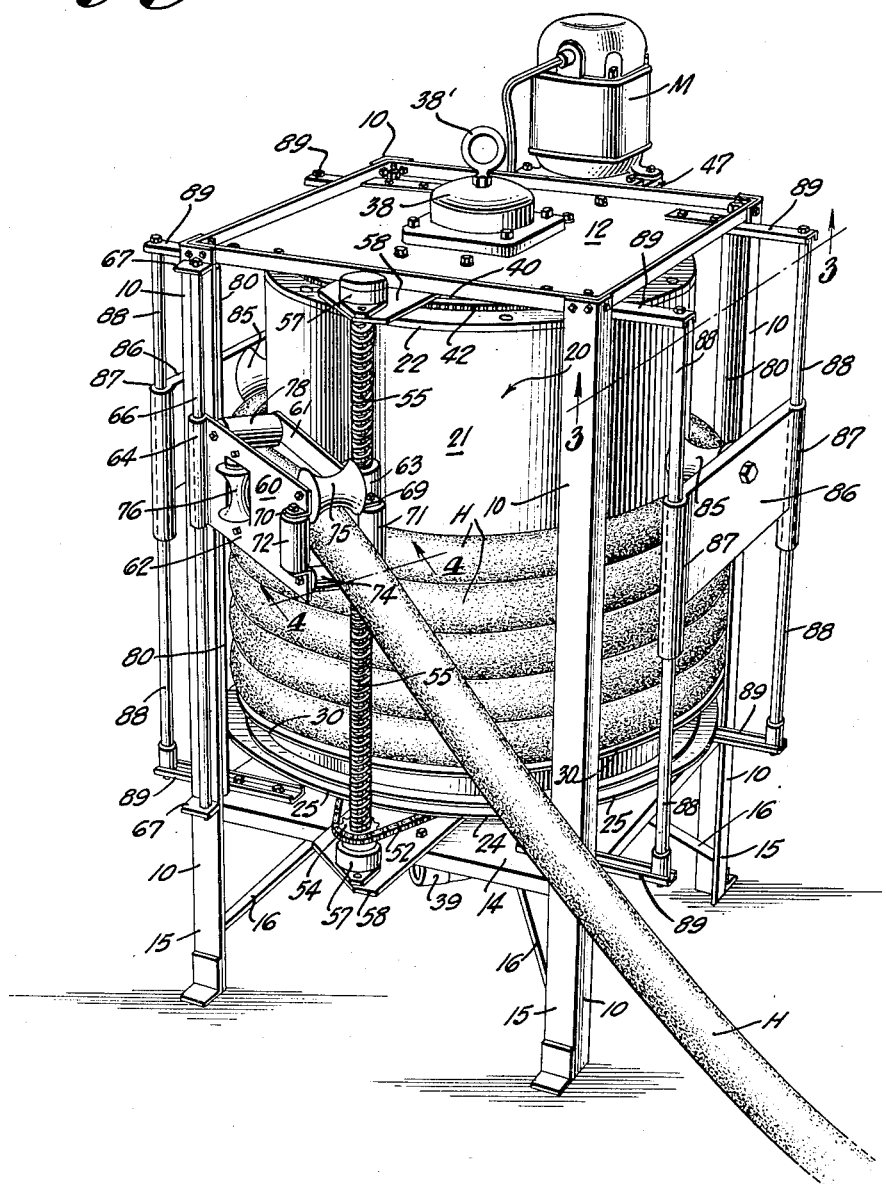
Fig. 1 is a perspective view showing the front, side and upper portion of an improved hose reel apparatus in accordance with the invention.
Figure 2:
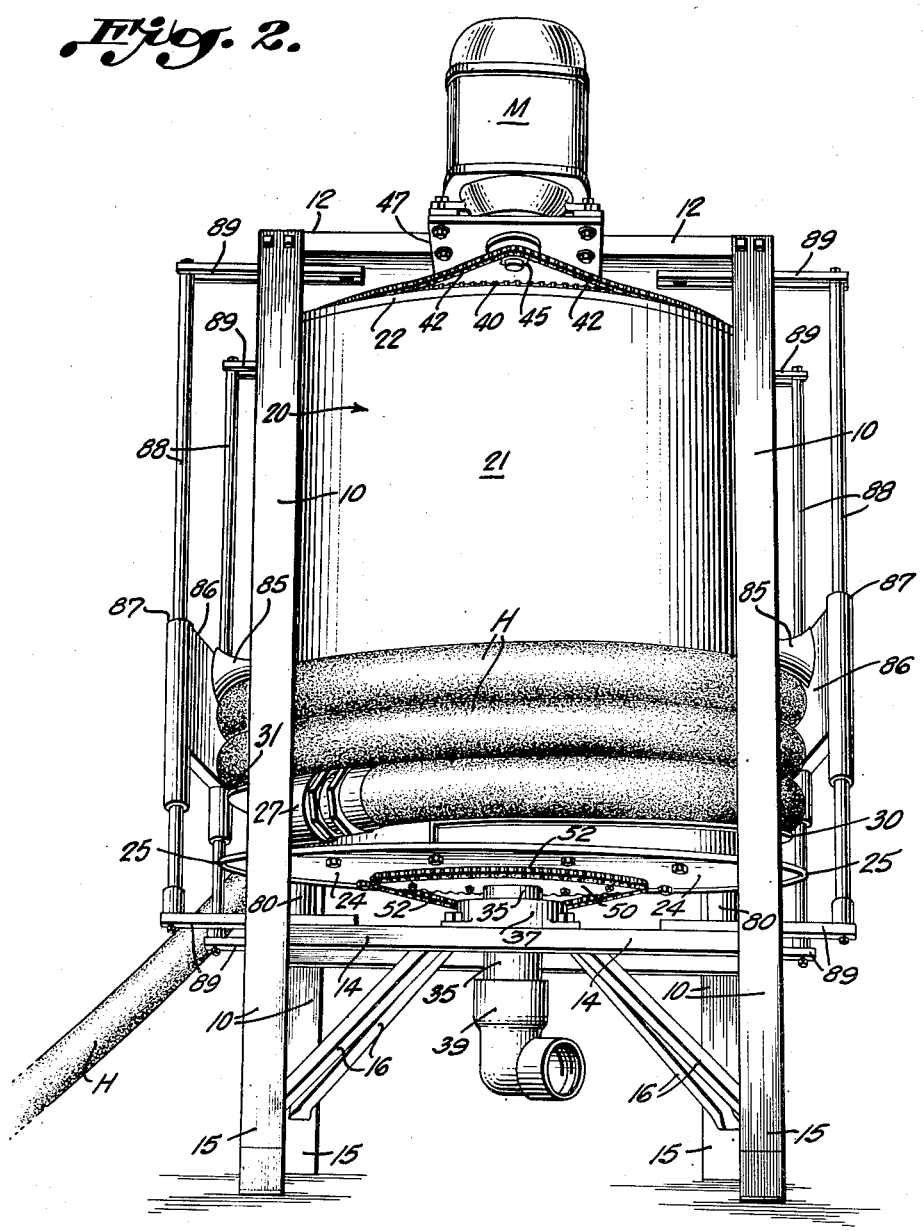
Fig. 2 is a perspective view showing the rearward side and lower portion of the hose reel apparatus.

Referring now, more particularly, to the drawings, the improved hose reel apparatus of the invention is disclosed, by way of illustration only, as provided in a construction which is particularly suitable for use at an airport underground service pit, or the like, for handling the relatively heavy hose used in fueling and defueling operations. Figs. 1 and 2 illustrate the general overall construction and arrangement of the operating parts of the hose reel apparatus and, of course, in the completed unit, this apparatus may include a removable casing or housing (not shown) which serves as a protective cover and provides the unit with a pleasing and ornamental appearance.

In the present example, the mounting for the hose reel is provided by an upright open frame composed of spaced vertical posts 10 which are bolted, welded or otherwise secured to the corners of a top panel 12 and a similar base panel 14. The lower ends of said posts 10 extend below the base panel 14 as necessary to provide supporting legs 15 which preferably are reinforced by braces or struts 16 extending between said legs 15 and the base panel 14.

The hose reel designated generally 20, Figs. 1 and 2, comprises a vertically extending drum 21 provided with an annular disc 22 secured to its upper end and a larger disc 24 which is bolted or otherwise secured to the lower end of the drum and defines an annular laterally projecting flange 25 at said lower end of the drum. Adjacent this annular flange 25, Fig. 2, an outlet pipe 27, provided with a suitable elbow on the end thereof, extends through a cutout in the drum 21 in radial relation thereto and is connected to a central tubular hose reel shaft 35 extending axially through the drum and serving as a fluid passage to said outlet pipe 27, substantially as disclosed in Patent Number 2,490,353 issued December 6, 1949 to the present inventor.

The flange 25 on the lower end of the drum carries a downwardly inclined track 30, or the like, which seats the lowermost convolution of the hose H. This track 30 extends from its lowest point adjacent the connection of the hose to the outlet pipe 27, Fig. 2, in a gradually increasing height around the drum as shown in Fig. 1. The track 30 at its highest portion 31, Fig. 2, is substantially in line with the upper surface of said lowermost hose convolution, and accordingly, directs the next or second hose convolution onto the lowermost hose convolution in even and uniform superposed relation therewith, substantially as shown in Fig. 2. Likewise, succeeding convolutions of the hose are built up on the drum 21 with the same general downward inclination as that of the lowermost hose convolution provided for by the downwardly inclined track 30. Accordingly, all convolutions of the hose H, as wound upon the drum 21, are disposed in a predetermined, uniform downwardly inclined relation which necessarily insures a reverse flow of all fluid in each convolution of the hose and a complete draining of such fluid through the entire hose to the outlet pipe 27 and thence to the fluid passage in the central tubular hose reel shaft 35.

The hose reel 20 thus provided is rotatably mounted in upright relation between the vertical posts 10 of the frame by supporting the projecting lower end of said hose reel shaft 35, Fig. 2, in a suitable thrust bearing contained in a housing 37 which in turn is supported on the base panel 14 of the frame and secured thereto by bolts, or the like. As seen in Fig. 1, a similar housing 38 containing a thrust bearing is bolted to the top panel 12 of the frame and rotatably supports a projecting end of the hose reel shaft 35 at the upper end of the hose reel. If desired, the housing 38 may be provided with an eye-bolt 38' for use in expeditiously handling and moving the hose reel apparatus as a unit. The mounting of the hose reel 20 otherwise is such that the lower projecting end of the tubular shaft 35 extends through the bearing 37 and the base panel 14 and is provided on its free end with a swivel coupling 39 which connects the same to the fluid supply line (not shown). The swivel coupling 39 may be of any suitable character which provides a fluid tight connection with the tubular hose reel shaft 35 while otherwise permitting rotation of said shaft relatively to said coupling 39 and the fluid supply line connected thereto.

Figure 3:
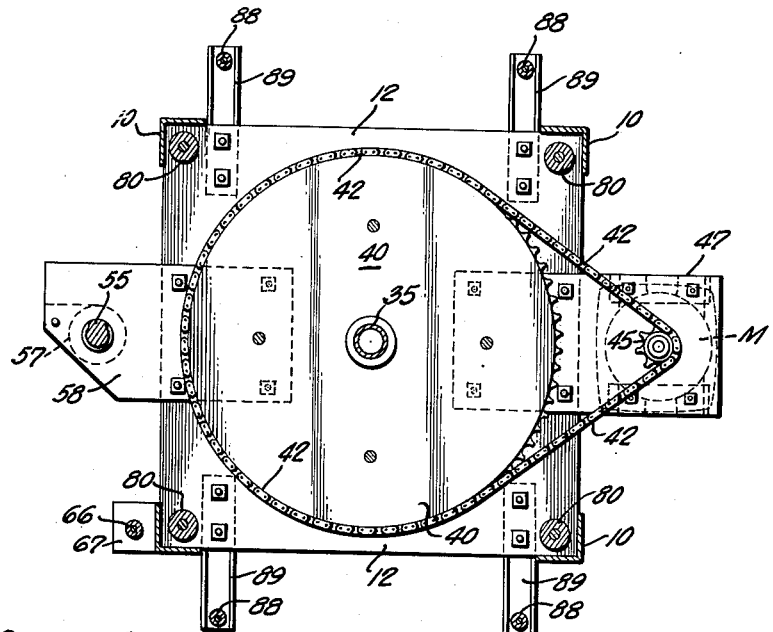
Fig. 3 is a sectional view on line 3—3 of Fig. 1 showing the simplified arrangement of the direct drive for the hose reel provided by a motor mounted on the frame of the apparatus.

As best seen in Figs. 2 and 3, driving means for rotating the hose reel 20 in a rewinding operation is provided in a simplified and highly advantageous construction by a plate-like sprocket wheel 40 secured to the top disc 22 of the hose reel drum 21 in concentric relation therewith. A sprocket chain 42 is provided in mesh with said sprocket wheel 40 and is driven by a drive sprocket gear 45 on the shaft of a motor M mounted on a bracket 47 bolted to the top panel 12 of the frame. The motor M is of a slow speed design and therefore, is advantageously employed in the simplified construction shown in Fig. 3 to provide a direct drive of the sprocket chain 42 and the sprocket wheel 40 for rotating the hose reel in a rewinding operation. It will be appreciated that this direct drive arrangement is provided without the need for reduction gearing or a clutch mechanism between the motor M and the means driving the hose reel, as is required in heretofore known hose reel apparatus, and consequently, important savings are involved in the use of this preferred arrangement for the hose reel driving means of the present invention. The motor M otherwise is provided in an explosion-proof design which offers no danger of sparks that might cause an explosion of volatile fluid in the hose prior to or during a rewinding operation.

As best seen in Fig. 2, a similar disc-like sprocket wheel 50 is secured onto the lower end 24 of the hose reel. A sprocket chain 52 is meshed with said sprocket wheel 50 and extends to the front of the apparatus, Fig. 1, in direct driving relation with a sprocket gear 54 secured to a rotary lead screw 55 extending vertically of the apparatus. The lead screw 55 is a simple threaded shaft having an upwardly directed helical thread along its length and suitable end portions for mounting the same in similar bearings 57 supported on brackets 58 bolted to the top panel 12 and base panel 14, respectively, of the frame of the apparatus.

Figure 4:
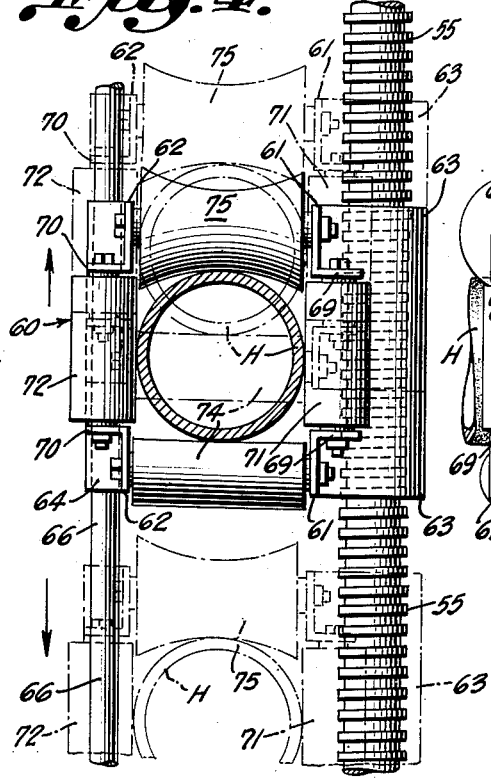
Fig. 4 is an enlarged elevational view, along line 4—4 of Fig. 1, showing the forward end of the travelling hose guide which is mounted on a vertical lead screw for movement upwardly and downwardly thereon as illustrated in broken lines; and, Fig. 5 is a side view of the travelling hose guide as seen from the right of Fig. 4 with the intermediate portion thereof removed.
Figure 5:
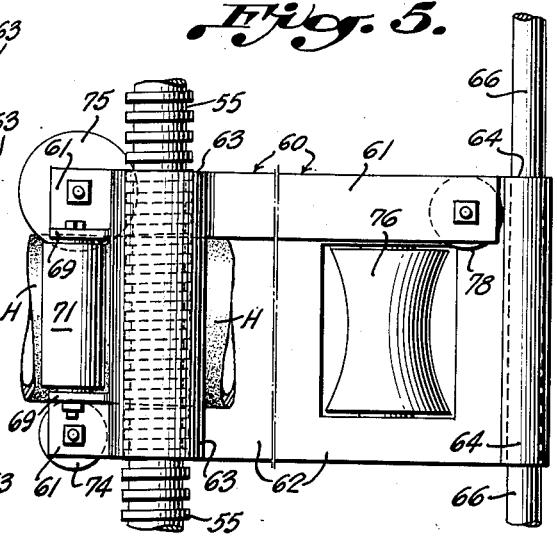

As shown in Figs. 1, 4 and 5, the rotary lead screw 55 supports a travelling guide or level wind device 60 which moves upwardly and downwardly on said lead screw in response to the turning thereof. The travelling guide 60 is provided in the manner of an open box-like carriage which defines a passage for the hose while guiding the hose onto the hose reel along predetermined horizontal paths in even and uniform convolutions thereon. The travelling guide 60 is composed of a pair of spaced plates 61, 62, carrying rollers in contact with the surface of the hose H. The inner plate 61 is provided with an internally threaded sleeve or collar 63 which is threadedly engaged with the lead screw 55 to support the travelling hose guide 60 at its forward end. The rearward end of the travelling guide 60 is supported by a smaller sleeve 64 on the outer plate 62 and which is telescoped on a vertical slide rod 66 secured at its ends by brackets 67 attached to the frame of the apparatus.

The side plates 61, 62, of the travelling guide 60 are formed with spaced side flanges 69, 70, respectively, provided by partially slit portions in said plates with the metal adjoining said slit portions bent outwardly to define such spaced side flanges 69, 70. A side roller 71 is rotatably mounted in the spaced side flanges 69 on the inner plate 61 by a suitable bolt or pintle serving as a shaft for said roller. Another side roller 72 is rotatably mounted in the same manner in the spaced side flanges 70 on the outer plate 62. Likewise, a lower roller 74 is mounted on the flanges defined by the lower corner portions of the spaced side plates 61, 62, and a cooperating upper roller 75 is supported in a similar manner on the flanges defined by the upper corner portions of said spaced side plates 61, 62. Preferably the roller 75 is provided in a contour corresponding to the contour of the hose H in order to reshape the same in the event of any flattening or other deformation of the hose in the use thereof. A similar side contour roller 76, Fig. 1, is mounted on the outer side plate 62 in a cutout therein and is rotatably supported on suitable flanges adjoining the cutout. Also, another upper roller 78 preferably is provided at the rear of the travelling guide 60 and mounted in flanges defined by the rearward upper corner portions of the spaced side plates 61, 62.

In addition to the travelling hose guide 60, supplementary guide means are provided by vertical guide rollers 80 in each of the four corners of the frame of the apparatus and rotatably mounted therein by bearings in the top panel 12 and base panel 14. These vertical rollers 80 are arranged to contact the hose at four equally spaced points as it is wound upon the hose reel 20 and thereby prevent any overwinding of the hose that might result in outwardly bulged portions forming pockets which would retain fluid in the hose and prevent a complete draining of the hose.

In this regard, there are also provided weighted contour or horizontal guide rollers 85 at each side of the frame which are movable upwardly and downwardly in contact with the hose as it is wound or unwound from the reel. As best seen in Fig. 1, such a contour or horizontal guide roller 85 is rotatably attached to a heavy plate 86 which serves as a weight and which is provided with tubular sleeves 87 slidable on a pair of spaced vertically extending bars 88 secured to the frame of the apparatus in any suitable manner, as by brackets 89 bolted to the top panel 12 and base panel 14. The plates 86 are thus slidable upwardly and downwardly on the spaced vertical bars 88 and provide a weighted force on the contour or horizontal guide rollers 85 carried thereby in contact with the hose. The contour rollers 85, accordingly, maintain the hose in closely packed, even and uniform convolutions and thereby prevent any climbing of the hose on the drum 21 that might cause traps or low spots which would retain fluid in the hose and prevent a complete draining thereof. These contour or horizontal guide rollers 85 otherwise serve in the same manner as the similar contour rollers 75, 76, on the travelling guide 60 to reshape any flattened or deformed portions which may develop in the hose in the use thereof.

From the foregoing, it will be understood that in the operation and use of the apparatus, the hose H is wound upon the reel 20 substantially as shown in Figs. 1 and 2 with the outer or free end of the hose passing through the travelling guide 60. When the hose H is fully wound on the drum 21, the travelling guide 60 is disposed adjacent the top of the reel at the upper end of the lead screw 55 and supports the free end of the hose in its normal, inoperative position.

Accordingly, for any dispensing operation, the hose H is adapted to be pulled by its free end and thereby unwound from the reel 20 for any desired length during which the inner end of the hose, Fig. 2, remains connected to the outlet pipe 27 and rotates along therewith and the hose reel 20. Any such rotation of the hose reel 20 is provided for by the swivel connection of the hose reel shaft 35 with the swivel coupling 39 connected to the source of fluid. When the desired length of hose H has been drawn from the drum 21, the dispensing operation may be commenced without further preparation inasmuch as the hose is already connected to the source of fluid through coupling 39, tubular shaft 35 and radial outlet pipe 27 connected to said tubular shaft 35, as aforesaid.

During any unwinding of the hose H, the reel rotates in a counter clockwise direction and simultaneously turns the sprocket wheel 50, Fig. 2, secured to the lower end thereof. The sprocket wheel 50 drives the chain 52 meshed therewith to rotate the sprocket gear 54 which turns the lead screw 55. Inasmuch as the internally threaded sleeve 63 on the travelling guide 60 is threaded with said lead screw 55, such turning of the lead screw 55 lowers the travelling guide 60 thereon a distance proportionate to the length of hose drawn from the reel.

Rewinding of the hose H on the reel is easily and quickly effected simply by switching on the electric motor M which rotates the sprocket gear 45, Figs. 2 and 3, on the shaft of said motor. The sprocket gear 45 drives the chain 42 in mesh with the sprocket wheel 40 on the top of the hose reel 20 to produce a clockwise rotation of said hose reel 20 which rewinds the hose thereon.

As the hose reel 20 is thus rotated, the sprocket wheel 50, Fig. 2, secured to the lower end thereof, simultaneously drives the chain 52 to rotate the sprocket gear 54, Fig. 1, which turns the lead screw 55 attached to said gear 54. Turning of the lead screw 55 actuates the sleeve 63 of the travelling guide 60 which is threadedly engaged with said lead screw 55. This provides a gradual upward travel of said guide 60 in a manner whereby it serves to guide the hose onto the hose reel 20 in even and uniform convolutions until it is fully wound thereon, in which relation the travelling guide 60 has returned to its aforesaid initial position at the upper end of said lead screw 55. The hose convolutions are formed on the reel under a positive guiding force provided by the vertical guide rollers 80 which contact each hose convolution at four spaced points about its periphery and thereby prevent any overwinding of the hose that might result in outwardly bulged portions forming pockets which would tend to retain fluid in the hose. At the same time, the weighted contour or horizontal guide rollers 85 bear upon each convolution of hose as it is wound on the reel and thereby insure rewinding of the hose in closely packed, even and uniform convolutions in a manner which prevents climbing of the hose on the drum 21 and the formation of any low spots which might retain fluid in the hose in this respect.

Inasmuch as the hose convolutions are thus built up on the downwardly inclined track 30 at the lower end of the hose reel, all convolutions of the hose have a corresponding downward inclination when the hose is fully rewound on the reel. This insures an automatic reverse flow of all fluid in each hose convolution thereby providing for a complete draining of the hose throughout its length in a manner whereby all fluid in the hose returns through the outlet pipe 27, Fig. 2, the tubular hose shaft 35 and the coupling 39, as aforesaid, whereupon such fluid is readily returned to the source of supply or to a sump or storage tank which is safely protected against fire or explosion.

While the invention has been described in detail with a specific example, such example is intended as an illustration only, inasmuch as it will be apparent that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of claims intended to be embraced therein.

What is claimed and desired to be secured by United States Letters Patent is:

1. Hose reel apparatus comprising a frame, a hose reel rotatably mounted in vertical relation in said frame, a drive member supported on said frame and connected to the upper end of the hose reel to rotate said hose reel, driven means on the lower end of said hose reel driven by the rotation of said hose reel, a lead screw rotatably mounted in vertical relation on said frame and turned by said driven means, a hose guide mounted on said lead screw and adapted to travel along the length of said lead screw, a downwardly inclined track provided adjacent the lower end of said hose reel, a hose adapted to be wound on said reel with its lowermost convolution supported in a downward inclination on said track and with the succeeding hose convolutions having a similar downward inclination to insure a return flow of fluid in the hose through the inner end of said hose, horizontal guide rollers independent of said hose guide bearing on the upper surface of the hose during the winding of the hose, and means mounting said horizontal guide rollers on the frame for movement up and down said frame while in contact with the hose.

2. Hose reel apparatus comprising a frame, a hose reel rotatably mounted in vertical relation in said frame, a drive member supported on said frame and connected to the upper end of the hose reel to rotate said hose reel, driven means on the lower end of said hose reel driven by the rotation of said hose reel, a lead screw rotatably mounted in vertical relation on said frame and turned by said driven means, a hose guide mounted on said lead screw and adapted to travel along the length of said lead screw, a downwardly inclined track provided adjacent the lower end of said hose reel, a hose adapted to be wound on said reel with its lowermost convolution supported in a downward inclination on said track and with the succeeding hose convolutions having a similar downward inclination to insure a return flow of fluid in the hose through the inner end of said hose, vertical guide rollers rotatably mounted in said frame and contacting the outer surfaces of the hose convolutions during the winding of the hose on the hose reel, horizontal guide rollers independent of said hose guide bearing on the upper surface of the hose during the winding of the hose, and means mounting said horizontal guide rollers on the frame for movement up and down said frame while in contact with the hose.

3. Hose reel apparatus comprising a frame, a hose reel rotatably mounted in vertical relation in said frame, a drive member supported on said frame, a sprocket wheel secured to the upper end of the hose reel, a sprocket chain driven by said drive member to rotate said sprocket wheel and hose reel, a second sprocket wheel secured to the lower end of said hose reel and a second sprocket chain in mesh therewith, a lead screw rotatably mounted in vertical relation on said frame and turned by said second sprocket chain, a hose guide mounted on said lead screw and adapted to travel along the length of said lead screw in response to the turning of said lead screw, a downwardly inclined track provided adjacent the lower end of said hose reel, a hose adapted to be wound on said reel with its lowermost convolution supported in a downward inclination on said track and with the succeeding hose convolutions having a similar downward inclination to insure a return flow of fluid in the hose through the inner end of said hose, horizontal guide rollers independent of said hose guide bearing on the upper surfaces of the hose convolutions during the winding of the hose, and means mounting said horizontal guide rollers on the frame for movement up and down said frame while in contact with the hose.

4. Hose reel apparatus comprising a frame, a hose reel rotatably mounted in vertical relation in said frame, a drive member supported on said frame, a sprocket wheel secured to the upper end of the hose reel, a sprocket chain driven by said drive member to rotate said sprocket wheel and hose reel, a second sprocket wheel secured to the lower end of said hose reel and a second sprocket chain in mesh therewith, a lead screw rotatably mounted in vertical relation on said frame and turned by said second sprocket chain, a hose guide mounted on said lead screw and adapted to travel along the length of said lead screw, a response to the turning of said lead screw, a downwardly inclined track provided adjacent the lower end of said hose reel, a hose adapted to be wound on said reel with its lowermost convolution supported in a downward inclination on said track and with the succeeding hose convolutions having a similar downward inclination to insure a return flow of fluid in the hose through the inner end of said hose, vertical guide rollers rotatably mounted in said frame and contacting the outer surfaces of the hose convolutions during the winding of the hose on the hose reel, horizontal guide rollers independent of said hose guide bearing on the upper surface of the hose convolutions during the winding of the hose, and means mounting said horizontal guide rollers on the frame for movement up and down said frame while in contact with the hose.

5. Hose reel apparatus comprising a frame, a hose reel rotatably mounted in vertical relation in said frame, a motor supported on the top of said frame, a sprocket gear on the shaft of said motor, a sprocket wheel secured to the upper end of said hose reel, a sprocket chain in mesh with said sprocket gear and said sprocket wheel for rotating said hose reel in a direct drive from said motor, a hose adapted to be wound and unwound from said reel, guide means for said hose, horizontal guide rollers independent of said guide means bearing on the upper surface of the hose during the winding of the hose on said reel, and means mounting said horizontal guide rollers on the frame for movement up and down said frame while in contact with the hose.

6. Hose reel apparatus comprising a frame, a hose reel rotatably mounted in vertical relation in said frame, a motor supported on the top of said frame, a sprocket gear on the shaft of said motor, a sprocket wheel secured to the upper end of said hose reel, a sprocket chain in mesh with said sprocket gear and said sprocket wheel for rotating said hose reel in a direct drive from said motor, a hose adapted to be wound and unwound from said reel, guide means for said hose, vertical guide rollers rotatably mounted in said frame and contacting the outer surface of the hose during the winding of the hose on the hose reel, horizontal guide rollers independent of said guide means bearing on the upper surface of the hose during the winding of the hose, and means mounting said horizontal guide rollers on the frame for movement up and down said frame while in contact with the hose.

7. Hose reel apparatus comprising a frame, a hose reel rotatably mounted in vertical relation in said frame, a downwardly inclined track provided adjacent the lower end of said hose reel and extending around the periphery thereof, a hose adapted to be wound on said reel with its lowermost convolution supported in a downward inclination on said track and with the succeeding hose convolutions having a similar downward inclination to insure a return flow of fluid in the hose through the inner end of said hose, guide means for said hose, horizontal guide rollers independent of said guide means bearing on the upper surface of the hose during the winding of the hose, and means mounting said horizontal guide rollers on the frame for movement up and down said frame while in contact with the hose.

8. Hose reel apparatus comprising a frame, a hose reel rotatably mounted in vertical relation in said frame, a downwardly inclined track provided adjacent the lower end of said hose reel and extending around the periphery thereof, a hose adapted to be wound on said reel with its lowermost convolution supported in a downward inclination on said track and with the succeeding hose convolutions having a similar downward inclination to insure a return flow of fluid in the hose through the inner end of said hose, guide means for said hose, vertical guide rollers rotatably mounted in said frame and contacting the outer surface of the hose convolutions during the winding of the hose on the hose reel, horizontal guide rollers independent of said guide means bearing on the upper surface of the hose during the winding of the hose, and means mounting said horizontal guide rollers on the frame for movement up and down said frame while in contact with the hose.

9. Hose reel apparatus comprising a frame, a hose reel rotatably mounted in vertical relation in said frame, a motor supported on said frame, a sprocket gear driven by said motor, a sprocket wheel secured to the upper end of the hose reel, a sprocket chain in mesh with said sprocket gear and sprocket wheel for rotating said hose reel, a second sprocket wheel secured to the lower end of said hose reel and a second sprocket chain in mesh therewith, a vertical lead screw rotatably mounted on said frame in parallel relation to said hose reel, a sprocket gear on said lead screw engaged by said second sprocket chain to turn said lead screw, a hose guide mounted on said lead screw and adapted to travel along the length of said lead screw in response to the turning of said lead screw, rollers carried by said hose guide for contacting a hose and including contour rollers for reshaping the hose, a downwardly inclined track provided adjacent the lower end of said hose reel, a hose adapted to be wound on said reel with its lowermost convolution supported in a downward inclination on said track and with the succeeding hose convolutions having a similar downward inclination to insure a return flow of fluid in the hose through the inner end of said hose, vertical guide rollers rotatably mounted in said frame and contacting the outer surfaces of the hose convolutions during the winding of the hose on the hose reel, horizontally disposed contour guide rollers independent of said hose guide bearing on the upper surface of the hose during the winding of the hose, and weighted plates mounting said horizontally disposed contour guide rollers on the frame for movement up and down said frame while in contact with the hose.

10. Hose reel apparatus comprising a frame, a hose reel rotatably mounted in vertical relation in said frame, a motor supported on the top of said frame, a sprocket gear on the shaft of said motor, a sprocket wheel secured to the upper end of said hose reel, a sprocket chain in mesh with said sprocket gear and said sprocket wheel for rotating said hose reel in a direct drive from said motor, a hose adapted to be wound and unwound from said reel, guide means for said hose, a horizontal guide roller independent of said guide means bearing on the upper surface of the hose during the winding of the hose on said reel, and means mounting said horizontal guide roller on the frame for movement up and down said frame while in contact with the hose.

CLIFFORD B. HANNAY.

REFERENCES CITED

The following references are of record in the file of this patent:

UNITED STATES PATENTS

| Number | Name | Date |
|---|---|---|
| 344,554 | Weygant | June 29, 1886 |
| 1,683,911 | Morris | Sept. 11, 1928 |
| 2,191,728 | Purcell et al. | Feb. 27, 1940 |
| 2,301,208 | Gear | Nov. 10, 1942 |
| 2,358,635 | Grise | Sept. 19, 1944 |
| 2,361,494 | Peter | Oct. 31, 1944 |